United States Patent
Fok

(10) Patent No.: US 8,315,651 B2
(45) Date of Patent: Nov. 20, 2012

(54) INSTANT MESSAGING TO A MOBILE DEVICE

(75) Inventor: Kenny K. Fok, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 443 days.

(21) Appl. No.: 09/848,070

(22) Filed: May 3, 2001

(65) Prior Publication Data

US 2002/0165000 A1 Nov. 7, 2002

(51) Int. Cl.
*H04W 4/00* (2009.01)
(52) U.S. Cl. .................. 455/466; 455/412.2; 455/414.4; 455/445
(58) Field of Classification Search .................. 455/466, 455/414.4, 414.1, 412.2, 411, 516, 519, 412.1, 455/432.2; 370/259, 270, 271, 328, 399, 370/496, 522; 379/157, 158, 161, 201.01, 379/201.02; 709/227, 206, 207, 224, 202
See application file for complete search history.

(56) References Cited

U.S. PATENT DOCUMENTS

| | | | |
|---|---|---|---|
| 6,289,223 B1 * | 9/2001 | Mukherjee et al. | 455/466 |
| 6,405,035 B1 * | 6/2002 | Singh | 455/414.1 |
| 6,424,841 B1 * | 7/2002 | Gustafsson | 455/466 |
| 6,564,261 B1 * | 5/2003 | Gudjonsson et al. | 709/227 |
| 6,691,162 B1 * | 2/2004 | Wick | 709/224 |
| 6,714,793 B1 * | 3/2004 | Carey et al. | 455/466 |
| 6,807,437 B1 * | 10/2004 | Andrus et al. | 455/575.7 |
| 7,020,685 B1 * | 3/2006 | Chen et al. | 709/204 |
| 7,043,538 B2 * | 5/2006 | Guedalia et al. | 709/220 |
| 2002/0035605 A1 * | 3/2002 | McDowell et al. | 709/206 |
| 2002/0143916 A1 * | 10/2002 | Mendiola et al. | 709/223 |
| 2003/0018704 A1 * | 1/2003 | Polychronidis et al. | 709/202 |

OTHER PUBLICATIONS

Harry Newton, Newton's Telecom Dictionary, Feb. 2001, 17th ed., pp. 554-555.*
Harry Newton, "Online", Newton's Telecom Dictionary, Mar. 2003, CMP Books, 19th ed., p. 574.*

* cited by examiner

*Primary Examiner* — Willie J Daniel, Jr.

(57) ABSTRACT

A wireless communications device logs on to an instant messaging service through a proxy server. Notification of an incoming instant message is provided to the wireless communications device by converting at least part of the instant message to Short Message Service (SMS) format or by transmitting a notice in SMS format that a message has been received.

7 Claims, 2 Drawing Sheets

INSTANT MESSAGING TO A MOBILE DEVICE

FIELD OF THE INVENTION

This invention relates to communications, and more particularly to the transmission of instant messages to and from a mobile device.

BACKGROUND

Instant messaging services have become popular for communicating quickly with other people. Generally, an instant messaging service enables a user to easily exchange textual messages with a friend or co-worker. In a such a messaging system, a user typically maintains a list of possible contact names in a list. The list includes a visual or audio indicator that informs the user which of the contacts are currently active on the messaging service. In a similar manner, when the user is on the messaging system, that user will be identified to others as being available to receive a communication.

Commercial examples of such instant messaging services include ICQ from ICQ, Inc., AOL's Instant Messenger and Yahoo's Messenger. Instant messaging may utilize a software program written for that purpose, or may be conducted through a standard web browser such as Microsoft's Internet Explorer or Netscape's Netscape browser. Instant messages are typically shorter and more conversational than electronic mail messages, due to the more-interactive nature of instant messaging.

An instant messaging system typically notifies users of changes in state of one or more other users. That is, a user can determine if another user is currently connected to the instant messaging system, and can determine whether that user changes his or her connection state. When a user logs into the instant messaging system, that user transmits presence information to the instant messaging system, announcing his or her presence on the system. When that user logs out of the instant messaging system, or terminates the connection to the instant messaging system, the presence information for that user is updated to show that the user is offline.

Instant messaging is presently used on wireless communications devices, such as wireless telephones, personal digital assistants (PDAs), laptop computers, and other hardware. To participate in an instant messaging service, the user's wireless communications device is connected by a voice channel to a wireless communications network. Instant message data travels over that voice channel, in the same manner as any data traverses a voice channel between the wireless communications device and the wireless communications network. Such transmission of data on a wireless voice channel may be referred to as a "data connection" in this document.

While the user can participate in instant messaging through a wireless data connection, the wireless data connection costs the user money in airtime fees, and can deplete the battery or batteries in the wireless communications device as quickly as a voice call. Further, the wireless data connection utilizes a channel on the wireless communications network, thereby consuming significant network resources for relatively small amounts of data.

SUMMARY

It is desirable for the user of a wireless communications device to participate in an instant messaging service without the need to maintain a data connection with a wireless communications network. It is therefore an object of the invention to allow a user of a wireless communications device to log into an instant messaging service via a data connection from a wireless communications device, then terminate the data connection without changing the user's connection state with regard to the instant messaging service. It is a further object of the invention to enable a wireless communications device to receive at least a portion of an instant message without the need to initiate or maintain a data connection with a wireless communications network.

To overcome the disadvantages of the prior art and meet the objectives of this invention, a wireless communications device logs on to an instant messaging service through a proxy server. Notification of an incoming instant message is provided to the wireless communications device by converting at least part of the instant message to Short Message Service (SMS) format or by transmitting a notice in SMS format that a message has been received.

In one aspect of the invention, a user of a wireless communications device logs on to an instant messaging service from a wireless communications device through a proxy server. A data connection is made between the wireless communications device and a wireless communications network to allow the user to log on to the instant messaging service. Upon login, the proxy server transmits presence information to the instant messaging service indicating that the user is online. The user may then terminate the data connection to the proxy server while leaving the wireless communications device in an active state. The proxy server then maintains the presence information for the user in the same state, such that user still appears as online to the instant messaging service. In this way, the user can participate in an instant messaging service when the user's wireless communications device is active, independent of whether a voice or data connection is in progress.

In another aspect of the invention, at least part of an instant message addressed to a user of a wireless communications device is converted to SMS format by the proxy server and transmitted to the wireless communications device. The user can thus receive at least a portion of an instant message while the wireless communications device is active, independent of whether a voice or data connection is in progress. The user can scan the content of the message and determine whether to initiate a data connection to respond to the instant message in instant message format. Because a data connection need not be initiated or maintained for the user to receive at least part of an instant message, power consumption by the wireless communications device is minimized. Further, network resources in the form of a data channel are conserved, as a data connection need not be in progress with the wireless communications device for that device to receive at least a portion of an instant message.

In another aspect of the invention, notification is transmitted in SMS format to a user of a wireless communications device when that user receives an instant message, where that notification may include an identifier of the entity originating the instant message.

In another aspect of the invention, an SMS message received from a user of a wireless communications device is converted to instant message format by the proxy server and transmitted to the addressee. The user thus can transmit short responses to instant messages received on the wireless communications device in SMS format.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
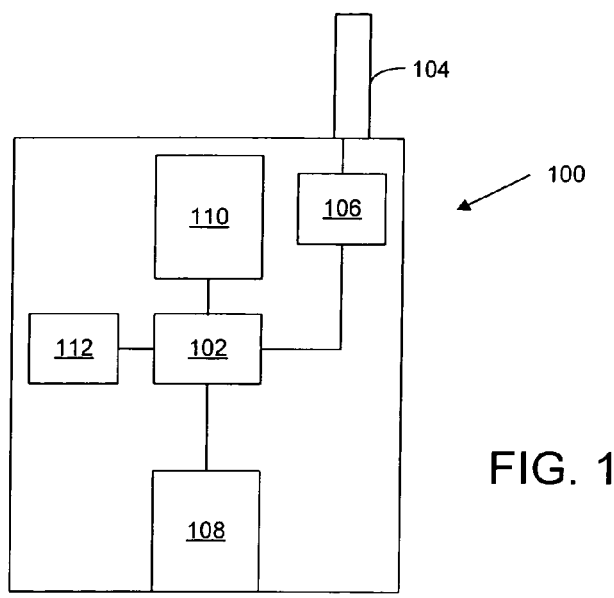
FIG. 1 is a block diagram of a wireless communications device.

Referring to FIG. 1, a block diagram of a wireless communications device 100 is shown. The wireless communications device 100 may be one of a number of different devices adapted for wireless communication, such as a cellular telephone, a wireless telephone operating on the PCS band, a portable digital assistant (PDA), a laptop computer having a wireless modem, or other device.

The wireless communications device 100 includes a processor 102. The processor 102 is capable of controlling the wireless communications device 100 and/or processing signals. The processor 102 is a logic unit such as an application-specific integrated circuit (ASIC), a microprocessor, a field-programmable gate array (FPGA), a digital signal processor (DSP), a combination of one or more of the above devices, or another device. The processor 102 is standard in the art.

The wireless communications device 100 also includes an antenna 104 adapted to receive signals from and transmit signals to a communications network (not shown). The antenna 104 is constructed to receive signals in a particular band, such as the cellular band or the PCS band. The use of an antenna 104 in a wireless communications device 100 is standard in the art. In one embodiment, a signal processor 106 connects the antenna 104 to the processor 102. The signal processor 106 may be an analog to digital (A/D) converter or other processor that receives signals acquired by the antenna 104 and performs processing on those signals before passing them to the processor 102. In another embodiment, the antenna 104 is directly connected to the processor 102.

The wireless communications device 100 also includes a battery 108. The use of a battery 108 in a wireless device is standard. In another embodiment, the wireless communications device 100 includes more than one battery 108. The use of more than one battery 108 may provide for longer operating time, or allow the use of a larger number of smaller batteries 108. The battery 108 is connected to the processor 102, directly or via standard power conditioning or control circuitry (not shown). In this way, the processor 102 receives power from the battery 108, and can control and monitor the discharge state of the battery 108.

A display 110 is also included in the wireless communications device 100. The display 110 may be a liquid-crystal display (LCD) or other type of display. The display 110 is electrically connected to and controlled by the processor 102. The use of a display 110 in a wireless communications device 100 is standard. The wireless communications device 100 also includes an input source 112, such as a keypad, keyboard, touchpad, mouse, a combination of such devices, or another device. The input source 112 is electrically connected to the processor 102. The use of an input source 112 in a wireless communications device 100 is standard.

Figure 2:
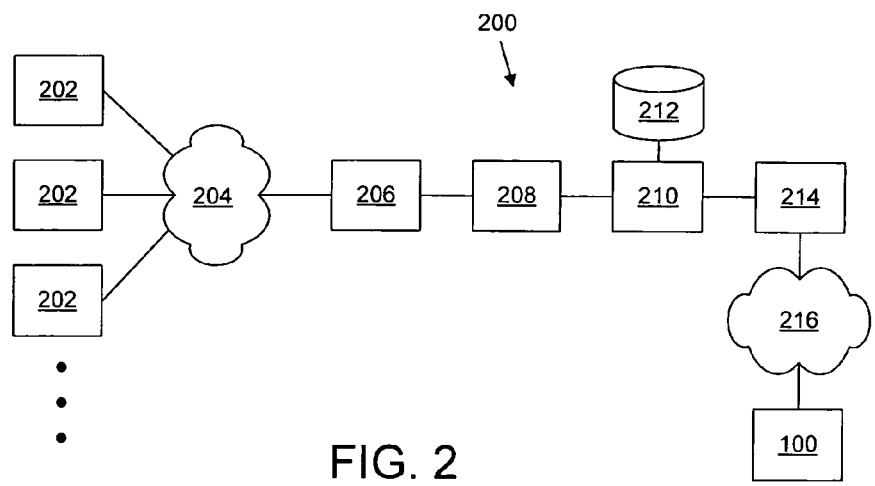
FIG. 2 is a block diagram of a wireless communications network with which the wireless communications device of FIG. 1 is adapted to function.

Referring as well to FIG. 2, a wireless communications network 200 is shown. The wireless communications device 100 is adapted to connect to and function with the wireless communications network 200. In one embodiment, the wireless communications network 200 conforms to the Telecommunication Industry Association standard designated IS-41. In another embodiment, the wireless communications network 200 conforms to the European Telecommunications Standards Institute (ETSI) standard designated GSM MAP. The wireless communications network 200 may conform to another standard adapted to support SMS, if desired.

One or more information handling systems 202 are connected to a data network 204. The information handling systems 202 may be personal computers, Internet appliances, personal digital assistants, game consoles, thin clients, or any other device capable of handling and transmitting information. Further, if more than one information handling system 202 is connected to the data network 204, the information handling systems 202 need not all be of the same type. The information handling systems 202 may be connected to the data network 204 by wires or by a wireless communication protocol, and different information handling systems 202 may be connected to the data network 204 in different ways. The data network 204 may be the Internet, a local area network (LAN), a wide area network (WAN), a virtual private network (VPN), or any other type of network over which data can travel.

A proxy server 206 is connected to the data network 204. In one embodiment, the proxy server 206 is a combination of software and a standard server device. The proxy server 206 allows a user of a wireless communications device 100 to appear logged in to an instant messaging service while the wireless communications device 100 is active but not participating in a data connection. The proxy server 206 intercepts incoming instant messages addressed to such a user, converts at least part of the content of those instant messages to SMS format, and transmits those SMS format messages to the user. Additionally, in one embodiment the proxy server 206 can receive an SMS message from the user via the wireless communications device 100, then convert that SMS message to instant message format and transmit that instant message over the data network 204. Instant messages directed to a user that is not logged into the proxy server 206 are not converted to SMS format. Instead, those instant messages may be bounced back to the sender, ignored, or otherwise handled. Further, messages already in SMS format simply pass through the proxy server 206 from the data network 204. That is, the proxy server 206 is transparent to incoming SMS messages. The functions of the proxy server 206 are described in greater detail below.

A short messaging service center (SMSC) 208 is connected to the proxy server 206. The SMSC 208 is standard in the art. In one embodiment, the SMSC 208 is a combination of hardware and software responsible for the relaying, storing and forwarding of a short message between the data network 204 and a wireless communications device 100.

One or more signal transfer points (STPs) 210 are connected to the SMSC 208. The STP 210 is standard in the art. In one embodiment, the STP 210 is a network element such as a packet switch that routes messages. Such messages may be, for example, standard Signaling System 7 (SS7) messages. The SS7 protocol is a standard protocol used in public networks to establish connections between switches.

A home location register (HLR) 212 is connected to each STP 210. A single HLR 212 may be connected to multiple STPs 210 and/or a unique HLR 212 may be connected to an individual STP 210. The HLR 212 is standard in the art. The HLR 212 is a database used for storage and management of subscription and service profiles associated with individual wireless communications devices 100 and/or users thereof.

Upon interrogation by the SMSC 208 via the STP 210, the HLR 212 provides routing information for a particular subscriber.

One or more mobile switching centers (MSCs) 214 are connected to each STP 210. The MSC 214 is standard in the art. In one embodiment, the MSC 214 is a combination of hardware and software that performs switching and controls calls to and from other telephone and data systems. The MSC 214 delivers an SMS message to a particular wireless communications device 100 over an air interface 216. The air interface 216 is a wireless protocol implemented over a particular base station system, as is standard in the art. The wireless protocol used in the air interface 216 may be GSM, TDMA, CDMA, or another protocol. These wireless protocols specify how signals are transferred from the MSC 214 to a wireless communications device 100 and back, as well as utilization of transmission frequencies, considering the available bandwidth and capacity. The base station system is standard, and includes a number of base stations that are utilized to generate signals to and receive signals from individual wireless communications devices 100.

Figure 3:
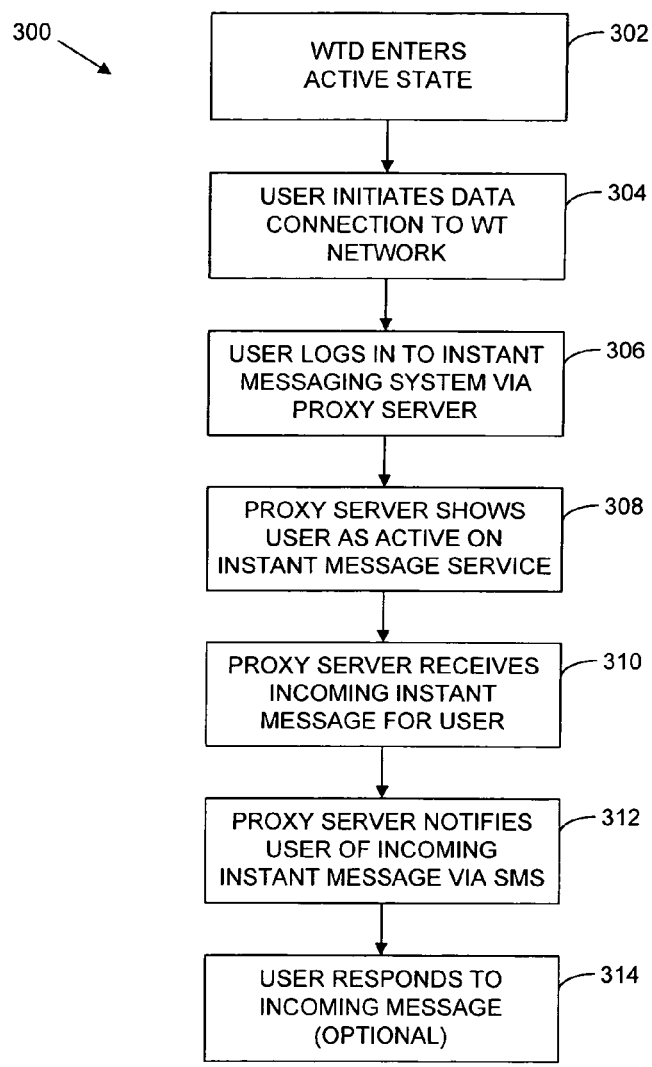
FIG. 3 is a method for enabling a user of a wireless communications device to participate in an instant messaging service without making a data connection.

Referring as well to FIG. 3, a method 300 is shown for enabling a user of a wireless communications device to participate in an instant messaging service without making a data connection. In block 302, the wireless communication device 100 enters an active state. In one embodiment, the active state is the state of the wireless communication device 100 when that device is powered up but is not connected to the wireless communication network 200. For example, if the wireless communication device 100 is a wireless telephone, then in block 302 the telephone is turned on but no voice or data connection is made with the wireless communications network 200. As another example, if the wireless communication device 100 is a PDA, then in block 302 the PDA is turned on but is not connected to the wireless communication network 200. When the wireless communication device 100 enters an active state, an indication that the device 100 has entered an active state is transmitted to the wireless communication network 200, as is standard. If the device 100 is in range of the network 200, the network 200 will recognize the presence of the active device 100.

In block 304, the user of the wireless communication device 100 initiates a data connection to the wireless communication network 200. The initiation of a data connection between the wireless communication device 100 and the wireless communication network 200 is standard in the art.

In block 306, the user logs into an instant messaging service via the proxy server 206, over the data connection established in block 304. The instant messaging service is hosted on or controlled by one or more external information handling systems 202. Logging on to an instant messaging service is standard, and typically involves entering a username and password. Upon logging in to the instant messaging service, the proxy server 206 transmits presence information to the instant messaging service indicating that the user is online. The transmission of presence information to an instant messaging service is standard. Other users of the instant messaging service may then see or be informed that the user is online. As one example, where the wireless communication device 100 is a wireless telephone, an option is offered to the user via the display 110 on the telephone for logging onto an instant messaging service. By selecting that option, such as by moving a cursor control on the display 110 of the telephone, the wireless communication device is connected to the proxy server 206 and logs in to the instant messaging service. The user then terminates the data connection to the proxy server 206, and the wireless communication device 100 remains in an active state. In another embodiment, in block 306 the user can log in to more than one instant messaging service via the proxy server 206.

In block 308, the proxy server 206 maintains the presence information of the user in the same state relative to the external instant messaging service. That is, the external instant messaging service is not notified of a change in the user's connection state, even though the user has terminated the data connection with the wireless communications device 100. The proxy server 206 thus acts as a proxy for the wireless communication device 100. The proxy server 206 maintains the presence information of the user with regard to the external instant messaging service such that the user appears active to other users of the instant messaging service, even though there is no data connection between the wireless communications device 100 and the wireless communications network 200. If in block 306 the user logged into more than one instant messaging service, then the proxy server 206 maintains the presence information of the user with regard to each of the external instant messaging services, such that the user appears active to other users of each instant messaging service.

The proxy server 206 maintains presence information for the user of "online" for the user as long as the user's wireless communications device 100 is active. If the user turns off his or her wireless communications device 100, the presence information for the user is updated to show that the user is offline, and the connection state is changed to offline. In one embodiment, the proxy server 206 determines if the wireless communications device 100 has gone offline by periodically sending special SMS messages to the mobile device and checking their delivery status. If one or more of those SMS messages is undeliverable, the proxy server 206 then considers the wireless communications device 100 to be offline, and updates the presence information for the user to show that the user is offline. In another embodiment, the proxy server 206 periodically queries the MSC 214 to obtain the status of the wireless communications device 100. If, in response to one or more queries from the proxy server, the MSC 214 returns data indicating that the wireless communications device 100 is offline, the proxy server 206 then considers the wireless communications device 100 to be offline, and updates the presence information for the user to show that the user is offline. Other methods may be used by the proxy server 206 to determine whether the wireless communications device 100 remains online, if desired.

Having established presence information of "online" for the user via the proxy server 206, independent of a data connection between the wireless communication device 100 and the communication network 200, the process 300 moves to step 310, in which the proxy server 206 receives an incoming instant message for the user. As described above, the proxy server 206 intercepts the instant message addressed to the user, before it is forwarded to the SMSC 208. The proxy server 206 can intercept the instant message in a number of ways. In one embodiment, the proxy server 206 reads the header or other identifier of the instant message to locate an identifier of the addressee, such as a username. The proxy server 206 then associates that instant message with a particular user for which the proxy server 206 is maintaining presence information relative to the external instant messaging service.

In block 312, the proxy server 206 notifies the user of the incoming instant message, utilizing SMS messaging. In one embodiment, the proxy server 206 notifies the user of the incoming instant message by converting at least a part of the instant message from instant message format to SMS format.

In one embodiment, the entire instant message is converted to SMS format if it is less than 190 characters in a GSM network and less than 120 to 205 characters in an IS-41 network, depending on the particular implementation of the IS-41 network. In another embodiment, if the instant message is over a defined length, only the number of characters up to that defined length is converted to SMS format. In a GSM network, that defined length is 190 characters, and in an IS-41 network that defined length may be between 120 and 205 characters. The instant message, or at least a portion thereof, is then transmitted in SMS format to the wireless communication device 100, which is in an active state. That SMS message is then displayed to the user on the display 110. As described above, the SMS message travels through the communications network 200 to the wireless communication device 100 independent of, and without the need for, a voice or data connection between the network 200 and the device 100.

In another embodiment of block 312, the proxy server 206 notifies the user of an incoming instant message by sending a notification to the wireless communication device 100 in SMS format, where the notification does not include the text of the instant message. In one embodiment, the notification includes the username or other identifier that appears in the header of a standard instant message. For example, a notification of an instant message received from a user John__65724 may include that user name John__65724, without any content associated with that user name identifier. In this way, the user of the wireless communication device 100 is notified that an instant message has been received from a particular other user, and can then determine whether further action should be taken. In another embodiment, the notification does not include an identifier associated with the incoming message; rather, the notification is simply a message alerting the user that he or she has received an instant message.

In block 314, the user of the wireless communication device 100 may respond to the SMS message received in block 312 if desired. In one embodiment, the user responds to the incoming message by initiating a data connection as described in block 304, connecting to the proxy server 206, and conducting a standard instant message session over a data connection with the initiator of the message received in block 312. In this way, the user of the wireless communication device 100 can wait for an instant message from another user while the wireless communication device 100 is in active mode, without needing to initiate a data connection until such time as an instant message has been received and the user wishes to respond to it.

In one embodiment, where only a portion of the instant message is converted to SMS format and transmitted to the wireless communications device 100, the proxy server 206 may save the entire instant message for a period of time. Further, the proxy server 206 may save multiple instant messages for the user. In such an embodiment, the user may initiate a data connection as described in block 304, connect to the proxy server 206, and review the one or more stored instant messages before deciding whether to respond to one or more of the stored instant messages.

In another embodiment, the user can respond to the message using SMS. The user may do so by transmitting an SMS message back to the proxy server 206, where that SMS message includes the user name of the person from whom the instant message was received, as well as any content the user wishes to send. The user name is preferably included in the SMS message originally received by the user on the wireless communications system 100. The proxy server 206 then converts the SMS message to instant message format and transmits the instant message to the external instant message service. This embodiment may be useful where the user wishes to send back a short message to the sender of an instant message. For example, if the initial instant message is a question asking if the user intends to be at a particular place at a particular time, the user of the wireless communication device 100 can enter the letter "Y" or "N" to provide a short answer to the initiator of the instant message session, without the need to initiate a data connection back to the proxy server 206.

Block 314 is optional. That is, the user of the wireless communication device 100 may decide, upon receipt of the SMS message in block 312, that he or she does not wish to respond to that particular user or that particular message, in which case the user need not respond.

In one embodiment, the proxy server 206 is invisible to the user of the wireless communication device 100. That is, the user need not be aware of the operation of the proxy server 206. Accordingly, in one embodiment, the operation of the proxy server 206 is triggered via options provided to the user on the display 110 of the wireless communication device. For example, logging into an instant messaging service via the proxy server 206 may be performed by selecting a particular option offered on the display 110 of the wireless communication device 100, where that option automatically establishes a connection with the proxy server 206 through which the user logs into the external instant messaging service.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A system for providing a wireless communications device access to an instant messaging service on a data network, the instant messaging service communicating instant messages in an instant message format, the system comprising:

a wireless communication network;

a short message service (SMS) center connected to the wireless communication network;

a plurality of information handling systems connected to the data network and logged into the instant messaging service for sending and receiving instant messages;

a wireless communications device, comprising:
   a battery;
   a processor, operatively coupled to the battery, configured to control and monitor a discharge state of the battery;
   the wireless communications device configured to:
      operate in an active state where the wireless communications device is powered on but is not connected to the wireless communication network;
      receive at least a portion of an intercepted instant message as a converted message while in the active state and without having a connection to the data network; and a proxy server having a first connection to the SMS center and a second connection to the data network, the proxy server configured to:
   establish a substitute proxy presence on the data network for the wireless communications device;

transmit presence information to the instant messaging service, in response to receiving instant messaging service login information from the wireless communications device;

maintain the presence information even when a data connection does not exist between the wireless communications device and the wireless network;

intercept and store an instant message addressed to the wireless communications device as the intercepted instant message, when the wireless communications device is in the active state;

convert at least a portion of the intercepted instant message into the converted message having a short message format, and send the converted message to the wireless communications device through the wireless network via the SMS center;

convert an identifier of a sender of the intercepted instant message into a converted identifier having a short message format and send the converted identifier to the wireless communications device;

save the entire intercepted instant message for a period of time, wherein a data connection to the proxy server by the wireless communications device enables viewing the entire intercepted instant message via the wireless communications device;

receive a response short message from the wireless communications device that is addressed to an information handling system of the plurality of information handling systems, convert the response short message into a converted response message having an instant message format, and send the converted response message to the information handling system.

2. The system of claim 1, wherein the proxy server is further configured to notify the SMS center that the instant message addressed to the wireless communications device has been received.

3. The system of claim 1, wherein the SMS center is configured to store the converted message.

4. The system of claim 1, wherein the proxy server is further configured to receives an indication that the wireless communications device is in an inactive state, and, in response, remove the substitute proxy server presence.

5. A method for providing a wireless communications device access to an instant messaging service:

transmitting, by a proxy server, presence information to the instant messaging service, in response to receiving instant messaging service login information from the wireless communications device;

maintaining, by the proxy server, the presence information, after the wireless communications device has disconnected a data connection to a wireless network while the wireless communications device remains in an active state;

determining, by the proxy server, that the wireless communications device is in the active state by sending a periodic short message service (SMS) message to the wireless communications device and checking the SMS message delivery status;

intercepting, by the proxy server, and storing, at least one instant message sent to the wireless communications device via the instant messaging service;

converting, by the proxy server, at least a portion of the at least one instant message to SMS format to create a converted message;

sending, by the proxy server, the converted message to the wireless communications device through the wireless network via an SMS center;

converting, by the proxy server, an identifier of the sender of the at least one instant message from the instant message format to SMS format to create a converted identifier, and sending the converted identifier to the wireless communications device through the wireless network via the SMS center;

saving, by the proxy server, the entire at least one instant message for a period of time, and enabling viewing of the at least one instant message by the wireless communications device via a data connection to the proxy server;

receiving, by the proxy server, a response message, in short message service format, from the wireless communications; and converting, by the proxy server, the response message to instant message format and transmitting the converted response message over a data network.

6. The method of claim 5, further comprising:

notifying, by the proxy server, the wireless communications device through the SMS center and the wireless network that the at least one instant message has been received.

7. The method of claim 6, wherein the step of notifying comprises:

converting, by the proxy server, at least a header portion of the at least one instant message from instant message format to SMS format to create a notification message; and sending, by the proxy server, the notification message to the wireless communications device through the wireless network via the SMS center.

* * * * *